(12) United States Patent
Chang et al.

(10) Patent No.: US 7,077,329 B2
(45) Date of Patent: Jul. 18, 2006

(54) SPECTRAL CODING BY FLUORESCENT SEMICONDUCTOR NANOCRYSTALS FOR DOCUMENT IDENTIFICATION AND SECURITY APPLICATIONS

(75) Inventors: Shoude Chang, Ottawa (CA); Ming Zhou, Ottawa (CA); Chander P. Grover, Ottawa (CA)

(73) Assignee: National Research Council of Canada, Ottawa (CA)

( * ) Notice: Subject to any disclaimer, the term of this patent is extended or adjusted under 35 U.S.C. 154(b) by 373 days.

(21) Appl. No.: 10/601,547

(22) Filed: Jun. 24, 2003

(65) Prior Publication Data
US 2004/0262400 A1     Dec. 30, 2004

(51) Int. Cl.
*G06K 19/06* (2006.01)
(52) U.S. Cl. ...................................... 235/491
(58) Field of Classification Search ............... 235/491; 283/93; 385/115–116, 88, 43, 31
See application file for complete search history.

(56) References Cited
U.S. PATENT DOCUMENTS
6,576,155 B1    6/2003    Barbera-Guillem

| 6,721,471 B1* | 4/2004 | MacKinnon ................. 385/16 |
| 6,774,361 B1* | 8/2004 | Bawendi et al. ............ 250/307 |
| 2002/0021003 A1 | 2/2002 | McGrew |
| 2003/0047100 A1* | 3/2003 | Brown et al. ............... 101/491 |

OTHER PUBLICATIONS

Han, Mingyong et al., "Quantum-dot-tagged microbeads for multiplexed optical coding of biomolecules", Nature Publishing Group, vol. 19, 2001.
Chan, Warren C.W. et al., "Luminescent quantum dots for multiplexed biological detection and imaging".

* cited by examiner

*Primary Examiner*—Thien M. Le
*Assistant Examiner*—Lisa M. Caputo
(74) *Attorney, Agent, or Firm*—Marks & Clerk; Richard J. Mitchell

(57) ABSTRACT

In a method of coding and retrieving information by using the unique emission properties of the semiconductor nanocrystals (quantum dots) for the identification of valuable documents, articles and objects, a carrier medium is prepared containing quantum dots selected to give the carrier medium defined fluorescent emission characteristics encoding predetermined information. The carrier medium is then applied to the object, preferably in the form of an ink.

11 Claims, 2 Drawing Sheets

FIG. 3a  FIG. 3b

SPECTRAL CODING BY FLUORESCENT SEMICONDUCTOR NANOCRYSTALS FOR DOCUMENT IDENTIFICATION AND SECURITY APPLICATIONS

FIELD OF THE INVENTION

This invention relates generally to the field of information encoding, and in particular to a method of encoding information in a small area, such as the corner of a document, a tiny surface of an article, and a small area of human nail for the purpose of identifications.

BACKGROUND OF THE INVENTION

The most prevalent technologies for the object identification are one- or two-dimensional bar codes. Because the barcode needs space to arrange the ordered data, either in a one-dimensional bar-sequence or two-dimensional image, the barcode reader has to scan the bar-sequence or register the image. These procedures make the system bulky and complicated. In addition, the visibility of the printed pattern of a barcode is vulnerable to counterfeiting, making barcodes useless in security applications.

Multiplexed optical coding technology has been reported for bioanalytical application. In this technology, the spectral features, namely wavelength and intensity, of fluorescence generated from multiple fluorescent substances are employed for coding information. Organic dyes and metal complexes are commonly used as fluorescent materials in various applications. In principle, they are applicable to the proposed multiplexed spectral coding technology (e.g., using multiple wavelengths and multiple intensities). However, they generally have inadequate adsorption and emission properties. Different exciting light wavelengths are required to excite a mix of multiple fluorescent molecules and the emission spectra are either broad or asymmetrical, making the information retrieval difficult. Among other problems encountered are also the possible interactions between two different fluorescent molecules and the immiscibility of the multiple fluorescent molecules in a common matrix material. From technical point of view, an ideal set of luminescent substances should have the following properties in order to meet the multiplexed coding:

Strong, single wavelength or mono-dispersed narrow emission for each individual luminescent substance;
  Emission spectrum independent of the exciting light in certain range of exciting wavelength;
  Single light source for all luminescent substances;
  No interaction among different fluorescent molecules, i.e., each luminescent substance responds to the exciting light independently;
  No influence of matrix material on emission; and
  Miscibility of all luminescent substances in the selected matrix materials The idea of using semiconductor nanocrystals for spectral coding of biomolecules has been proposed by Han et al. "Quantum-dot-tagged microbeads for multiplexed optical coding of biomolecules", Nature Biomtechnology, 2001, 19, 631–635.

SUMMARY OF THE INVENTION

The invention provides a hidden information carrier of tiny size that is invisible to the human eye. It potentially is of great importance for the security applications. Since the information encoded inside the carrier is totally position-invariant, i.e. neither sequence nor pixel based, it greatly simplifies the decoder. The invention relates to the application of quantum dots and their unique spectral characteristics for document security.

According to the present invention there is provided a method of encoding data onto an object, comprising preparing a carrier medium incorporating quantum dots selected to give said carrier medium defined fluorescent emission characteristics encoding predetermined information; and applying said carrier medium to said object.

In one embodiment an info-drop is provided. This is made by formulating a composite (info-ink) of QDs, polymers and solvents based on the defined spectroscopic features and other requirements. The info-ink is then applied to the objects (by printing e.g.,) that need to be coded. If necessary, one or multiple protective layer(s) can be applied to the info-drop to prevent it from being damaged.

In accordance with another aspect of the invention there is provided a method of decoding information encoded by the emission characteristics of quantum dots in a carrier medium, comprising exciting the quantum dots in said carrier medium to initiate fluorescence; and processing the resulting emission spectra to extract said decoded information.

In accordance with yet another aspect of the invention there is provided an apparatus for decoding information encoded by the emission characteristics of quantum dots in a carrier medium, comprising a light source for exciting said quantum dots to emit light; a detector for detecting said emitted light; and a processor for extracting said encoded information from the emission characteristics of said quantum dots.

BRIEF DESCRIPTION OF THE DRAWINGS

The invention will now be described in more detail, by way of example only, with reference to the accompanying drawings, in which.

DETAILED DESCRIPTION OF THE PREFERRED EMBODIMENTS

Figure 1:
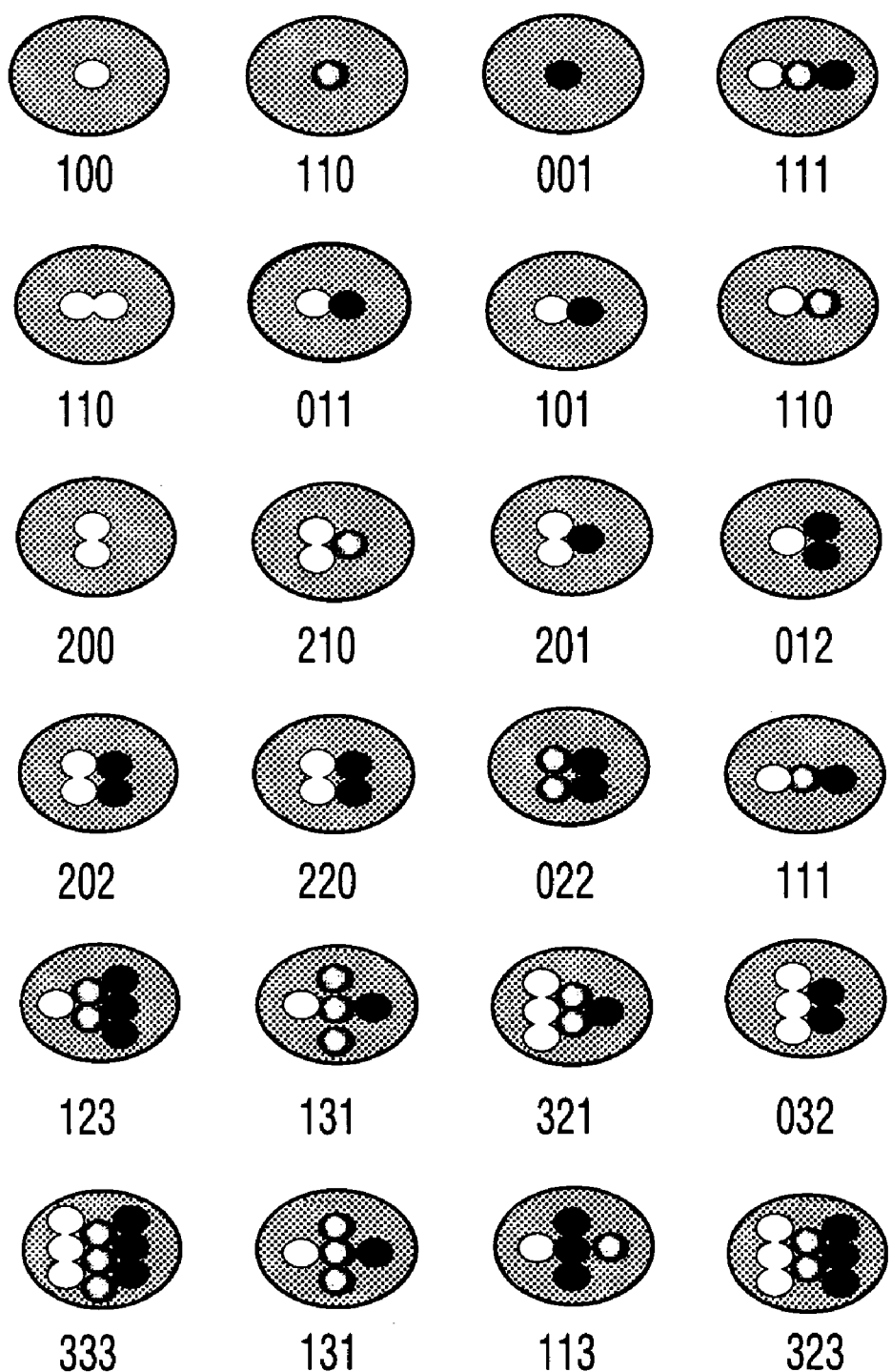
FIG. 1 shows the an array of quantum dots encoding information.

Recently available quantum dots (QDs offer applicability to the multiplexed optical coding technology. QDs are semiconductor nanocrystals of 1–10 nm in size. Materials of QDs are semiconducting materials often from the Group IIB and Group VIA in the periodic table of the elements. QDs can be made from a single compound, such as cadmium selenide (CdSe) and zinc sulfide, or from multiple compounds in a specific manner such as CdSe—ZnS core-shell. A mixture of QDs with different emission wavelength can emit the light with spectral feature that is dedicatedly designed to represent a set of data. Since the information is coded in fluorescence spectrum, it needs a spectroscopic device rather than a scanner or camera to decode the information. In addition, its very small size and invisibility best serve the purpose of the security applications. Such a tiny, transparent information carrier, termed info-drop, can be easily applied to the surface of an object, including the passport, ID card and even a nail of human finger.

QDs are generally prepared via sophisticated solution chemical processes and stored in specific solvent to prevent the aggregation and precipitation. In order to use QDs for the spectral coding of non-biological objects such as banknotes, passports, certificates and other valuable documents, a paintable or printable QDs/polymer/solvent system (info-ink) is needed.

The commercial availability of QDs with different wavelengths provides a great number of combinations of wavelength and intensity. For example, an encoder using 6-wavelength/10-intensity QD has a theoretical coding capacity of about one million discrimination code. The coding space can be even expanded by utilizing a third property that can be decoded (e.g., the geometry of the info-drop decoded by a CCD camera).

In accordance with the principles of the invention, info-inks consisting of polymer, solvent, multiple QDs and other additive are prepared to make the info-drops on the objects that need to be coded. A hybrid optic-electronic-digital system is used to extract the data. The detailed description is given below.

The info-ink consists of fluorescent semiconductor nanocrystals or QDs, a polymer or blend of polymers, solvent and other additives.

QDs used in this invention are semiconducting materials, preferably but not limited to, those from selected from the Group IIB and Group VIA in the periodic table of the elements, such as cadmium selenide(CdSe), cadmium sulfide(CdS), zinc selenide(ZnS) and zinc sulfide (ZnS). For infrared emission, materials may be selected from other groups such as lead selenide (PbSe).

QDs in this invention have diameters ranging from one nanometer to one hundred nanometers. The emission of QDs can cover the whole visible range and near-infrared range (from 400 nm to 3000 nm). For the same material system, the smaller the QD, the shorter is the fluorescent wavelength. For example, CdSe QDs with a nominal diameter of 2.8 nm show the fluorescence at 535 nm, while QDs of 5.6 nm CdSe crystals have an emission centered at 640 nm. QDs of lead selenide of various diameters can emit fluorescence in the near-infrared range. QDs can be made from single semiconducting materials and from a pair of materials in the core-shell configuration. For example, the core composition can be CdSe and the shell composition can be ZnS. Such core-shell structured QDs have higher emission efficiency that the single composition QDs.

Polymers are used in the info-ink as a matrix material, in which the QDs with different emission wavelengths are distributed homogeneously. The polymers in the invention should not have a quenching effect on the fluorescence of the QDs. They also need to meet other requirements such as solubility in selected solvents, long-term environmental stability, good compatibility and miscibility with QDs.

Suitable examples of polymers which are employed in the invention are polystyrene(PS) and poly(methyl methacrylate)(PMMA).

Solvents used in the formulation of the info-ink include aqueous and non-aqueous solvents, preferably aqueous solvents. For example toluene can be employed as a solvent to make CdSe (mixture of different diameters)/PS info-ink. A mixture of solvents can be used to improve the properties such as solubility, viscosity, volatility, storage stability and adhesion etc.

Additives can be used in the info-ink to improve certain properties, such as viscosity and adhesion, without influencing the major fluorescent property.

An info-ink with a defined data coding is prepared by adjusting the concentration ratio of QDs with different fluorescent wavelengths. This procedure includes the following steps.

(1) Establishment of the relationship of fluorescent intensity (I) with QD concentration (c) in a specific polymer matrix;
(2) Determination of the amounts of QDs based on the established I~c relationship of each individual QD;
(3) Mixing the QDs with polymer(s), solvent and other additive if necessary.

The coded info-ink is then applied to objects to form info-drops. These info-drops with defined data coding are formed on the objects, such as, banknotes, passports and important certificates by printing, painting or other methods depending on the shape and surface conditions of the objects to be coded.

FIG. 1 shows info-drops representing different codes achieved by varying the amount and type of quantum dots in the ink. For example, the code 100 is represented by a single type of quantum dot at a predetermined concentration. Code 200 is represented by the same type of quantum dot at double the concentration. Codes 010, and 001 are represented by respective different types of quantum dots. Code 111 is represented by an ink containing all three types in equal concentration.

In order to prevent the info-drop from being scratched or damaged by any way, a cover layer, may optionally be applied to the top of info-drop. The protective layer is made of a polymer material that is either the same as or different from the polymer matrix material.

Figure 2:
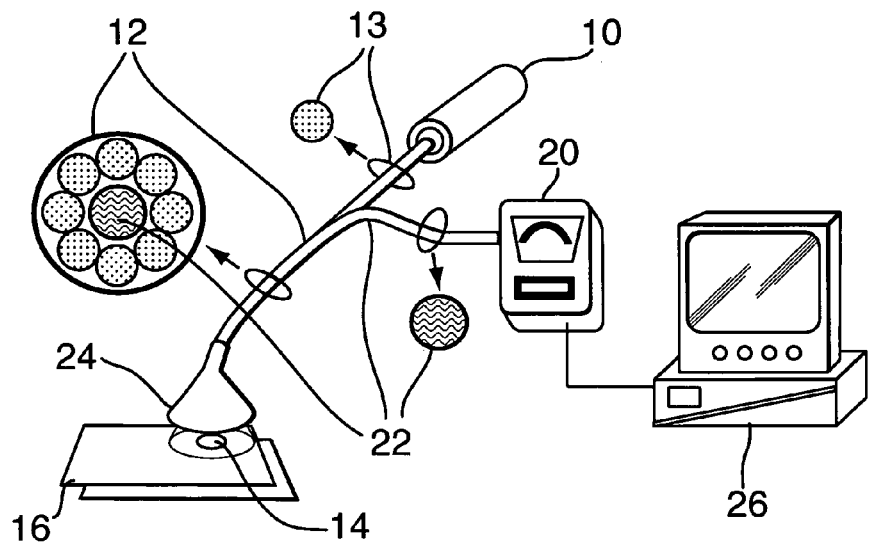
FIG. 2 is a simplified diagram showing a decoding system in accordance with one embodiment of the invention; and, FIGS. 3a to 3c illustrate principle of spectral line separation.

An apparatus for retrieving the information hidden in an info-drop is shown in FIG. 2. An exciting light source 10 is provided by a Light Emitting Diode (LED) laser or mercury lamp, which has the broad-band in the near-UV range (330–385 nm). A bunch of optical fibers 12 guides the exciting light to an info-drop 14 bonded on the surface of an object 16, such as an ID card, to be identified. The fluorescent light emitted by the quantum is fed to a spectrum sensor 20 by a detecting fiber 22. The spectral data created by the sensor is further delivered to an intelligent instrument, e.g. a micro-processor or a PC, which eventually extracts the information originally coded in the info-drop.

In order to obtain an even exciting light, the exciting fibers 13 are arranged to surround the detecting fiber 22 evenly to form a fiber optics bundle 12, as shown in FIG. 2. A rubber cup 24 is connected at the end of the fiber bundle to ensure that only the excited fluorescent light can enter the sensor.

The task of the intelligent instrument 26, typically a PC, consists of two steps.

1) Preprocessing step: removing the noise by a digital filter, and separating the spectral lines in the spectrum by a de-convolution operation.
2) Decoding step: finding the positions and intensities of all the spectral lines, and decoding the original data according to a known prior code book.

Because the spectrum of quantum dots has a Gaussian type profile, the neighboring spectral lines may mutually affect the intensity of each other, i.e. introduce spectral alias, as shown in FIG. 3a. This effect will eventually result in a decoding error.

A spectrum function of quantum dots can be described as $$f(\lambda) = \Sigma_i k(\lambda i) \cdot \delta(\lambda - \lambda i) \otimes p(\lambda), \quad (1)$$

where $\delta(\lambda)$ represent an impulse function, physically, a spectral line, $k(\lambda i)$ is the intensity of a $\delta(\lambda)$ at $\lambda i$, $p(\lambda)$ denotes the profile function of the spectrum of quantum dots, and ⊗ represents a convolution operation. The broad profile is the main reason causing the spectrum alias. To get rid of the alias effect, a de-convolution operation is needed, and it can be easily done in the Fourier domain. The Fourier transform, FT[ ], of Equation (1) is given by $$FT[f(\lambda)] = \Sigma_i k(\lambda i) \cdot FT[\delta(\lambda - \lambda i)] \cdot FT[p(\lambda)]. \quad (2)$$

Because of the fact that the $f(\lambda)$ is the measured input data and $p(\lambda)$ is a known function, the accurate non-profile spectral lines can be restored in accordance with the equation $$\Sigma_i k(\lambda i) \cdot \delta(\lambda - \lambda i) = IFT\{FT[f(\lambda)]/FT[p(\lambda)]\}. \quad (3)$$

Equation (3) is a de-convolution operation performed in spectrum domain. The principle of this procedure is illustrated in FIG. 3. FIG. 3a shows the input data $f(\lambda)$]; 3b is the known profile function of a spectral line $p(\lambda)$; 3c gives the solved spectral lines, $\Sigma_i k(\lambda i) \delta(\lambda - \lambda i)$, which are peeled off their profiles.

Figure 3C:
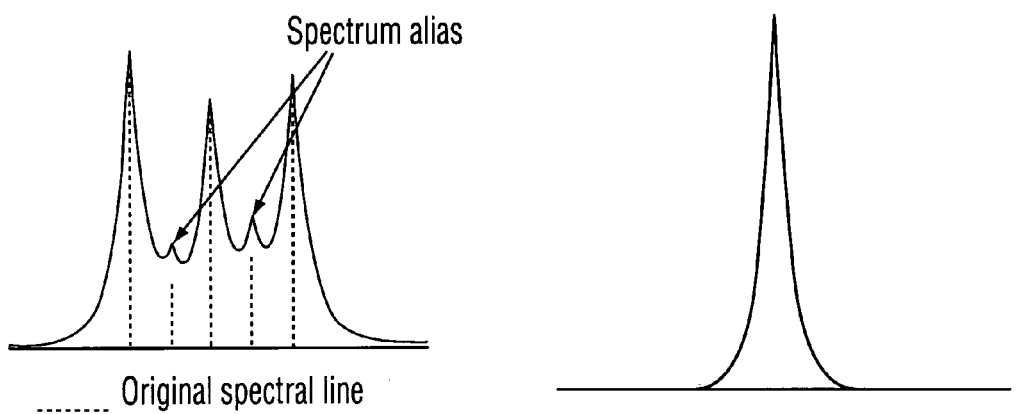
Figure 3C:
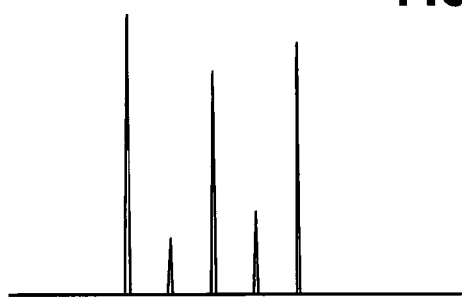

In FIG. 3a, the intensities of the shorter spectral lines are increased due to the spectrum alias. The spectral lines with their accurate intensities are restored by de-convolution, as shown in FIG. 3c. The restored intensities guarantee the correctness of information decoded from the info-drop.

Numerous other embodiments may be envisaged without departing from the spirit and scope of the invention.

We claim:

1. A method of decoding information encoded by the positions and intensities of spectral lines in the emission spectrum of quantum dots in a carrier medium, wherein a set of codes in a code book is characterized by different combinations of said positions and intensities, comprising:
    exciting the quantum dots in said carrier medium to initiate fluorescence;
    sensing the resulting emission spectrum of the quantum dots;
    performing a deconvolution operation to separate the spectral lines in said emission spectrum;
    processing the resulting data to find the positions and intensities of the spectral lines in said emission spectrum; and
    extracting the decoded information by reference to said code book; and
    wherein the de-convolution operation is represented by the equation $\Sigma_i k(\lambda i) \cdot \delta(\lambda - \lambda i) = IFT \{FT[f(\lambda)]/FT[p(\lambda)]\}$,
    where $\delta(\lambda)$ represent an impulse function, $k(\lambda i)$ is the intensity of a $\delta(\lambda)$ at $\lambda i$, $p(\lambda)$ denotes the profile function of the spectrum of quantum dots.

2. A method as claimed in claim 1, wherein said emission spectra are pre-processed to remove noise.

3. A method as claimed in claim 2, wherein said noise is removed with a digital filter.

4. A method as claimed in claim 1, wherein said de-convolution operation is performed in the Fourier domain.

5. An apparatus for decoding information encoded by the positions and intensities of spectral lines in the emission characteristics of quantum dots in a carrier medium, wherein a set of codes in a code book is characterized by different combinations of said positions and intensities, comprising:
    a light source for exciting said quantum dots to emit light;
    a spectroscopic detector for sensing the emission spectrum of the emitted light; and
    a processor for extracting said encoded information from the emission characteristics of said quantum dots by
    performing a de-convolution operation to separate the spectral lines in said emission spectrum;
    processing the resulting data to find the positions and intensities of the spectral lines in said emission spectrum; and
    extracting the decoded information by reference to said code book; and
    wherein the de-convolution operation is represented by the equation $\Sigma_i k(\lambda i) \cdot \delta(\lambda - \lambda i) = IFT \{FT[f(\lambda)]/FT[p(\lambda)]\}$,
    where $\delta(\lambda)$ represent an impulse function, $k(\lambda i)$ is the intensity of a $\delta(\lambda)$ at $\lambda i$, $p(\lambda)$ denotes the profile function of the spectrum of quantum dots.

6. An apparatus as claimed in claim 5, wherein said processor is responsive to the intensity and emission spectra of said quantum dots to extract said encoded information.

7. An apparatus as claimed in claim 6, wherein said processor includes a digital filter for removing noise.

8. An apparatus as claimed in claim 5, wherein said detector is coupled to said light source by a first optical fiber surrounded by a bundle of optical fibers connected to said light source.

9. An apparatus as claimed in claim 8, wherein said bundle of optical fibers terminates in an inverted funnel.

10. An apparatus as claimed in claim 5, wherein said processor is a computer connected to said spectrum detector.

11. An apparatus as claimed in claim 5, wherein said de-convolution operation is performed in the Fourier domain.

* * * * *